US012316776B2

(12) United States Patent
Kaliski, Jr. et al.

(10) Patent No.: US 12,316,776 B2
(45) Date of Patent: May 27, 2025

(54) INTEGRATED DNS SERVICE PROVIDER SERVICES USING CERTIFICATE-BASED AUTHENTICATION

(71) Applicant: VERISIGN, INC., Reston, VA (US)

(72) Inventors: Burton S. Kaliski, Jr., McLean, VA (US); Swapneel Sheth, Fairfax, VA (US); Karthik Shyamsunder, Winchester, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 15/251,497

(22) Filed: Aug. 30, 2016

(65) Prior Publication Data

US 2018/0062856 A1    Mar. 1, 2018

(51) Int. Cl.
| | |
|---|---|
| *H04L 9/00* | (2022.01) |
| *H04L 9/32* | (2006.01) |
| *H04L 9/40* | (2022.01) |
| *H04L 61/4511* | (2022.01) |
| *H04L 67/53* | (2022.01) |

(52) U.S. Cl.
CPC .......... *H04L 9/3263* (2013.01); *H04L 9/006* (2013.01); *H04L 9/3247* (2013.01); *H04L 61/4511* (2022.05); *H04L 63/0823* (2013.01); *H04L 67/53* (2022.05)

(58) Field of Classification Search
CPC ... H04L 9/3263; H04L 61/1511; H04L 67/20; H04L 63/0823; H04L 9/006; H04L 9/3247
See application file for complete search history.

(56) References Cited

U.S. PATENT DOCUMENTS

| | | | |
|---|---|---|---|
| 6,052,733 A | 4/2000 | Mahalingam et al. | |
| 6,119,234 A | 9/2000 | Aziz et al. | |
| 6,961,783 B1 | 11/2005 | Cook et al. | |
| 7,644,117 B2 | 1/2010 | Zimmerman et al. | |
| 7,987,251 B2 | 7/2011 | Blinn et al. | |
| 7,996,457 B2 | 8/2011 | Parsons et al. | |
| 8,073,783 B2 | 12/2011 | Felsted et al. | |
| 8,402,508 B2 | 3/2013 | Rouskov et al. | |
| 8,571,990 B2 | 10/2013 | Buss | |
| 8,745,718 B1 | 6/2014 | Dufel et al. | |
| 8,904,519 B2 | 12/2014 | Essawi et al. | |
| 8,949,982 B2 | 2/2015 | Gould et al. | |
| 9,106,712 B1 | 8/2015 | Gardos et al. | |
| 9,130,926 B2 | 9/2015 | Nori et al. | |

(Continued)

FOREIGN PATENT DOCUMENTS

WO    2012/091974 A1    7/2012

OTHER PUBLICATIONS

M. Hunt, System for Managing a Shared Domain Registry draft-nzrs-srs-02, Jul. 26, 2010 (Year: 2010).*

(Continued)

*Primary Examiner* — Syed M Ahsan
(74) *Attorney, Agent, or Firm* — McCarter & English, LLP; Michael A. Sartori

(57) ABSTRACT

Techniques for allowing third-party DNS service providers to programmatically initiate changes to DNS resource records using an interface provided by a registrar or registry are disclosed. Further, techniques for validating change requests received at such an interface are disclosed. The disclosed techniques reduce errors and increase convenience.

24 Claims, 6 Drawing Sheets

(56) References Cited

U.S. PATENT DOCUMENTS

| | | | |
|---|---|---|---|
| 9,137,094 | B1 | 9/2015 | Sayed et al. |
| 9,485,213 | B2 | 11/2016 | Schilling |
| 9,684,918 | B2 | 6/2017 | Kamdar |
| 9,807,053 | B1 | 10/2017 | Schilling et al. |
| 10,015,134 | B2 | 7/2018 | Gould et al. |
| 10,476,836 | B1 | 11/2019 | Saleem et al. |
| 2002/0059146 | A1 | 5/2002 | Keech |
| 2002/0152400 | A1 | 10/2002 | Zhang et al. |
| 2003/0140223 | A1 | 7/2003 | Desideri |
| 2004/0167982 | A1 | 8/2004 | Cohen et al. |
| 2004/0249961 | A1 | 12/2004 | Katsube et al. |
| 2005/0021965 | A1* | 1/2005 | Van Horn ........... H04L 63/0823 713/176 |
| 2005/0102354 | A1 | 5/2005 | Hollenbeck et al. |
| 2006/0031330 | A1 | 2/2006 | Ruiz |
| 2007/0208869 | A1 | 9/2007 | Adelman et al. |
| 2009/0300355 | A1 | 12/2009 | Crane et al. |
| 2010/0049790 | A1 | 2/2010 | Schreiber |
| 2010/0325723 | A1 | 12/2010 | Essawi et al. |
| 2011/0225637 | A1 | 9/2011 | Counterman |
| 2011/0276485 | A1 | 11/2011 | Varga |
| 2012/0136936 | A1 | 5/2012 | Quintuna |
| 2012/0174198 | A1* | 7/2012 | Gould ................. H04L 63/0807 726/6 |
| 2012/0254386 | A1* | 10/2012 | Smith ................. H04L 61/4511 709/223 |
| 2012/0260322 | A1 | 10/2012 | Logan et al. |
| 2012/0314856 | A1* | 12/2012 | Zaverucha .............. H04L 9/321 380/44 |
| 2013/0080341 | A1 | 3/2013 | Veeramachaneni et al. |
| 2013/0104202 | A1 | 4/2013 | Yin et al. |
| 2013/0191884 | A1 | 7/2013 | Leicher et al. |
| 2014/0013396 | A1 | 1/2014 | Field-Eliot et al. |
| 2014/0075513 | A1 | 3/2014 | Trammel et al. |
| 2014/0189834 | A1 | 7/2014 | Metke et al. |
| 2014/0337914 | A1 | 11/2014 | Canning et al. |
| 2015/0058960 | A1 | 2/2015 | Schmoyer et al. |
| 2015/0295905 | A1 | 10/2015 | Leicher et al. |
| 2015/0295916 | A1 | 10/2015 | Sanso et al. |
| 2015/0312257 | A1 | 10/2015 | Antipa et al. |
| 2016/0057100 | A1* | 2/2016 | Blinn ...................... H04L 67/53 709/219 |
| 2016/0134599 | A1 | 5/2016 | Ross et al. |
| 2016/0269396 | A1 | 9/2016 | Ren et al. |
| 2017/0006021 | A1 | 1/2017 | Karaatanassov et al. |
| 2017/0070595 | A1 | 3/2017 | Gould et al. |
| 2017/0187673 | A1 | 6/2017 | Kaliski, Jr. et al. |
| 2017/0279617 | A1* | 9/2017 | Blinn ...................... H04L 63/06 |
| 2017/0279762 | A1* | 9/2017 | Fregly ................... H04W 12/02 |
| 2018/0063141 | A1 | 3/2018 | Kaliski, Jr. et al. |
| 2018/0351943 | A1 | 12/2018 | Yasukawa et al. |
| 2020/0153938 | A1 | 5/2020 | Gould et al. |
| 2021/0234696 | A1 | 7/2021 | Kaliski, Jr. et al. |
| 2022/0103654 | A1 | 3/2022 | Gould et al. |
| 2022/0292584 | A1 | 9/2022 | Kumar et al. |
| 2023/0155834 | A1 | 5/2023 | Kaliski, Jr. et al. |

OTHER PUBLICATIONS

Mark Jeftovic, "Nameserver Operators Need the Ability to "Disavow" Domains", CircleID Internet Infrastructure, Dec. 2, 2014, Retrieved from the Internet: http://www.circleid.com/posts/20141202_nameserver_operators_need_the_ability_to_disavow_domains/, pp. 1-5.

Godaddy, "Cashparking", Retrieved from the internet on Feb. 19, 2016: https://www.godaddy.com/domains/cashparking, pp. 1-5.

Certified-Domains, "The Internet Hotspot for Domains, Email, Web Hosting, Certified Domains, and More!", Retrieved from the Internet on Feb. 19, 2016: http://www.certified-domains.com/Certified-Domains.html, p. 1.

M. Hunt, "Systems for Managing a Shared Domain Registry", Sep. 29, 2010, Retrieved from the Internet on Jan. 23, 2017: https://docs.nzrs.net.nz/_downloads/draft-nzrs-srs-03.pdf, pp. 1-169.

Extended European Search Report dated Jan. 31, 2017, European Application No. 16186666.0, pp. 1-8.

Extended European Search Report dated May 4, 2017, European Application No. 16206770.6, pp. 1-6.

PTO Non-Final Office Action dated Nov. 16, 2017, U.S. Appl. No. 14/844,703, pp. 1-49.

Extended European Search Report dated Dec. 15, 2017, European Application No. 17188586.6, pp. 1-8.

Extended European Search Report dated Dec. 15, 2017, European Application No. 17188591.6, pp. 1-8.

PTO Non-Final Office Action dated Mar. 22, 2018, U.S. Appl. No. 15/251,716, pp. 1-47.

Bruce Schneier, Applied Cryptography, Protocols, Algorithms, and Source Code in C, 1996, 8.12 Public-Key Key Management, pp. 185-187 (6 pages).

Afred J. Menezes et al., Handbook of Applied Cryptography, 1997, 1.6 Digital Signatures, pp. 22-23 (6 pages).

Non-Final Office Action issued in corresponding U.S. Appl. No. 15/251,716 on Nov. 4, 2019, pp. 1-21.

Non-Final Office Action cited in corresponding U.S. Appl. No. 14/980,158 on Nov. 1, 2019, pp. 1-18.

US Office Action issued in corresponding U.S. Appl. No. 15/251,716 on Apr. 29, 2020, 24 pages.

US Office Action issued in corresponding U.S. Appl. No. 14/980,158 on Apr. 2, 2020, 42 pages.

Hardaker, W., "Child-to-Parent Synchronization in DNS", Internet Engineering Task Force (IETF), Request for Comments: 7477, dated Mar. 2015 (located at https://tools.ietf.org/html/rfc7477), 16 pages.

US Office Action issued in corresponding U.S. Appl. No. 15/251,716 on Dec. 18, 2020, 20 pages.

Office Action issued in U.S. Appl. No. 15/251,497 on Mar. 27, 2019, 19 pages.

Office Action issued in U.S. Appl. No. 15/251,497 on Nov. 21, 2018, 24 pages.

Office Action issued in U.S. Appl. No. 15/251,716 on Jun. 16, 2021, 34 bages.

Office Action issued in U.S. Appl. No. 15/251,716 on Oct. 16, 2018, 28 pages.

Applied Innovations, How to Manage DNS through your Domain Registrar, Mar. 2015, https://support.appliedi.net/kb/a216/how-to-manage-dns-through-your-domain-registrar.aspx[Sep. 26, 2018], 2 pages.

dnsmadeeasy.com, Authoritative vs Recursive DNS Servers Whats the Difference, Jul. 17, 2013, http:/social.dnsmadeeasy.com/blog/authoritative-vs-recursive-dns-servers-whats-thedifference/[Mar. 12, 2019], 3 pages.

Fisher, S., A Beginners Guide to Domain Name Management—Feb. 18, 2014, https://blog.hubspot.com/insiders/domain-name-management[Sep. 26, 2018], 9 pages.

Google, About registrars and registries—Google Domains Help—Sep. 14, 2015, https://web.archive.org/web/20150914225714/https://support.google.com/domains/answer/3251189hl=en[Mar. 12, 2019], 1 page.

Notice of Allowance issued in U.S. Appl. No. 14/980,158 on Jun. 30, 2020, 52 pages.

Notice of Allowance issued in U.S. Appl. No. 14/980,158 on Nov. 19, 2020, 16 pages.

Notice of Allowance issued in U.S. Appl. No. 14/980,158 on Aug. 12, 2020, 39 pages.

Notice of Allowance issued in U.S. Appl. No. 14/980,158 on May 5, 2021, 20 pages.

Office Action issued in U.S. Appl. No. 14/980,158 on Mar. 19, 2019, 47 pages.

Office Action issued in U.S. Appl. No. 14/980,158 on Oct. 4, 2018, 57 pages.

Hunt, M., "System for Managing a Shared Domain Registry", draft-nzrs-srs-02, Network Working Group, New Zealand Registry Services, Jul. 26, 2010, pp. 1-162.

Icann, Unsponsored TLD Agreement—Appendix C (.pro), dated Sep. 30, 2004; retrieved from https://www.cann.org/resources/unthemed-pages/registry-agmt-appc-2004-09-30-en (20 pages).

(56) References Cited

OTHER PUBLICATIONS

Information Security Stack Exchange, OAuth 2 vs OpenID Connect to secure API, Jul. 2015, https://security.stackexchange.com/questions/94995/oauth-2-vs-openid-connect-to-secure-api[Sep. 25, 2018], 5 pages.

Kumari et al., "Automating DNSSEC Delegation Trust Maintenance", Internet Engineering Task Force IETF), Request for comments: 7344, dated Sep. 2014 (located at https://tools.ieft.org/html/rfc3744), 19 pages.

Mr. DNS, What is TLD Name Server, Aug. 17, 2009, http://www.dnsknowledge.com/whatis/tld-name-server/ [Mar. 12, 2019], 4 pages.

Nat, Dummys Guide for the Difference between Oauth Authentication and OpenID, May 15, 2011, https://nat.sakimura.org/2011/05/15/dummys-guide-for-the-difference-between-oauth-authentication-and-openid/[Sep. 25, 2018], 10 pages.

Office Action issued in corresponding European Patent Application No. 16206770.6, issued on Jan. 28, 2019, pp. 1-5.

Corrected Notice of Allowability issued in U.S. Appl. No. 14/844,703 on Dec. 16, 2019, 15 pages.

Corrected Notice of Allowability issued in U.S. Appl. No. 14/844,703 on Sep. 27, 2019, 14 pages.

Notice of Allowance issued in U.S. Appl. No. 14/844,703 on Sep. 10, 2019, 15 pages.

Notice of Allowance issued in U.S. Appl. No. 16/746,483 on Jun. 8, 2021, 12 pages.

Office Action issued in U.S. Appl. No. 14/844,703 on Apr. 5, 2019, 25 bages.

Office Action issued in U.S. Appl. No. 14/844,703 on May 24, 2018, 34 pages.

Office Action issued in U.S. Appl. No. 14/844,703 on Nov. 5, 2018, 19 pages.

Office Action issued in U.S. Appl. No. 16/746,483 on Mar. 16, 2021, 21 bages.

Office Action (Communication pursuant to Article 94(3) EPC) issued in European Application No. 16186666.0 on Apr. 9, 2019, 5 pages.

Notice of Allowance issued in U.S. Appl. No. 14/980,158 on Aug. 17, 2021, 14 pages.

Notice of Allowance issued in U.S. Appl. No. 16/746,483 on Aug. 16, 2021, 19 pages.

Office Action issued in U.S. Appl. No. 17/227,660 on Sep. 20, 2021, 78 pages.

OAuth Core 1.0, https://oauth.net/core/1.0/, Dec. 4, 2007 [retrieved on Sep. 15, 2021], 14 pages.

Notice of Allowance issued in U.S. Appl. No. 16/746,483 on Nov. 22, 2021, 12 pages.

\* cited by examiner

INTEGRATED DNS SERVICE PROVIDER SERVICES USING CERTIFICATE-BASED AUTHENTICATION

RELATED APPLICATION

This application is related as a parent application to co-pending continuation U.S. application Ser. No. 15/251,716 entitled "Integrated DNS Service Provider Services Using Token-Based Authentication" to Burton S. Kaliski, Jr., Swapneel Sheth, and Karthik Shyamsunder, filed concurrently herewith.

FIELD

This disclosure relates generally to implementing changes in the domain name system ("DNS") for the internet.

BACKGROUND

The DNS is a hierarchical distributed naming system for resources provided by computer servers that are connected to the internet. It associates domain names to numeric internet protocol ("IP") addresses of internet resources, including resources managed by "web hosting providers", which provide the web server computers that serve the web pages associated with domain names. As used herein, web hosting provides are identified with their server computers unless stated otherwise or clear form context. The DNS thus allows computers and humans to access networked resources including web pages using names.

The DNS uses "resource records", which are formatted data structures that include information relevant to performing DNS tasks. For example, IP addresses are specified by DNS "A" or "AAAA" resource records, which include both a domain name and the associated IP address for the computer server that hosts the domain, i.e., the web hosting provider.

The DNS is organized into "zones", the basic unit of organization of authoritative name data for the DNS. The DNS relies on extensive delegation of such authority. DNS name server (NS) resource records are used to specify such authority. In that respect, the term "child" refers to an entity of record to which a "parent" entity delegates name resolution authority for a domain, or portion thereof. The terms "parent" and "child" are also generally identified with the respective zones.

A DNS "registry" is an authoritative, master database of all domain names registered in a top-level domain or other domain in which domain names can be registered. A registry includes many hardware computer servers operably coupled to the internet. A registry keeps the master database and also generates a "zone file" comprising DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

Domain names can be registered by internet users known as "registrants" through many different companies known as "registrars". Registrars compete with one another to register domain names for registrants. That is, an internet user interacts with a registrar to obtain a domain name, thereby becoming a registrant for the domain. The registrar chosen by the registrant asks the registrant to provide various contact and technical information that makes up the registration. The registrar then keeps a record of the contact information and submits the technical information to the registry. Registrars typically include many hardware computer servers. For ease of discussion, a registrar is identified with its hardware computer servers unless otherwise specified or clear from context. Further, an internet user has a hardware client computer. For ease of discussion, a registrant is identified with its hardware client computer unless otherwise specified or clear form context.

A "DNS operator" or "DNS provider" is an entity that runs one or more DNS servers. For a zone's authoritative servers, the registrant may act as their own DNS operator, their registrar may do it on their behalf, or they may use a third-party DNS operator. For some zones, the registry function is performed by the DNS operator plus other entities who decide about the allowed contents of the zone. Other terms used to identify the DNS operator are "name server operator" and "managed DNS service provider". DNS operators' name servers are specified by NS records. DNS operators typically include one or more hardware computer servers. For ease of discussion, a DNS operator is identified with its hardware computer servers unless otherwise specified or clear from context. A DNS registry operator is typically the DNS operator for its own zone, e.g., for the top-level domain; it delegates authority for zones within the domain to other name server operators via NS resource records.

A "mail exchanger" is a computer server configured to accept email for a given domain. The mail exchanger determines, for example, which mailbox should receive an email message sent to its domain name. Mail exchangers are identified by mail exchanger (MX) DNS resource records. For ease of discussion, a mail exchanger is identified with both its hardware computer servers and its operator unless otherwise specified or clear form context.

A cryptographic hash (or simply "hash") is typically a function that can input any of a variety of computer-interpretable objects and output a fixed-size string, e.g., a hexadecimal number. Cryptographic hashes typically have other useful properties such as preimage resistance and collision resistance.

A digital signature, or simply "signature", is typically the result of applying a private key of an asymmetric cryptographic key pair to a computer-interpretable object. The corresponding public key is typically published or otherwise made available by the signing entity to the verifying party. The object may first be hashed as part of the signature process. A verifying party can verify the signature by applying the public key to the signature and comparing the result to the object or the hash of the object, depending on the scheme. If the comparison results in a match, then the signature is valid; otherwise it is invalid. Digital signatures typically confer authentication, non-repudiation, and object integrity.

A digital certificate, or simply "certificate", is a package that includes information identifying a public key (e.g., the key itself or a hash of the key), together with information identifying the owner of the key, and a digital signature of at least some of the package contents. The digital signature is produced (i.e., signed) by a trusted party, such as a certification authority. A digital certificate provides any entity that trusts the party that signed the certificate with the ability to validate that the signed public key is indeed associated with the party identified in the certificate.

The DNS security extensions ("DNSSEC") are a set of specifications for securing the integrity of certain information provided by the DNS. For example, DNSSEC specifies certain DNS resource records that must include digital signatures, which permit certain DNS information to be verified as valid and unaltered. DNSSEC helps ensure that internet users are connecting to the correct web site or other service that corresponds to a particular domain name.

SUMMARY

According to various embodiments, a computer-implemented method to electronically implement a change to at least one domain name system (DNS) resource record on behalf of a registrant of a domain name is presented. The method includes sending to a DNS entity for the domain name, electronically and via a computer network, an identification of a DNS service provider and a public key of an asymmetric cryptographic scheme of the DNS service provider, such that the registrar confirms an identity of the DNS service provider using the identification and the public key; and sending data representing the change to the at least one DNS record from the service provider to the DNS entity via the computer network; such that a DNS registry for the domain name obtains and implements the change to the at least one DNS record.

Various optional features of the above embodiments include the following. The service provider may include a DNS operator, and the at least one DNS record may include at least one of a name server (NS) DNS resource record or a delegation signer (DS) DNS resource record. The service provider may include a mail exchanger, and the at least one DNS record may include a mail exchanger (MX) DNS resource record. The DNS entity may include a DNS registrar. The DNS entity may include a DNS registry. The sending to a DNS entity for the domain name, electronically and via the computer network, an identification of a DNS service provider and a public key of an asymmetric cryptographic scheme of the DNS service provider may include sending a digital certificate digitally signed by a certification authority's private key of an asymmetric cryptographic scheme, where the certificate is validatable by a certification authority's public key corresponding to the certification authority's private key. The sending the digital certificate may include sending by way of a representational state transfer interface at the DNS entity. The certification authority may include one of the registrar, the registrant, and the DNS registry. The sending data representing the change to the at least one DNS record may include sending by way of a representational state transfer interface at the DNS entity. The method may further include receiving, by the service provider and from the DNS entity, via the computer network, an access token, where the access token specifies permissible DNS resource record actions, and where the access token includes a digital signature; where the sending data representing the change to the at least one DNS record may further include sending the access token. The change may include a DNS resource record update, a DNS resource record creation, or a DNS resource record deletion.

According to various embodiments, a system for implementing a change to at least one domain name system (DNS) resource record on behalf of a registrant of a domain name is presented. The system includes at least one electronic computer including at least one electronic processor communicatively coupled to a computer network and configured to perform operations including: sending to a DNS entity for the domain name, electronically and via the computer network, an identification of a DNS service provider and a public key of an asymmetric cryptographic scheme of the DNS service provider, such that the registrar confirms an identity of the DNS service provider using the identification and the public key; and sending data representing the change to the at least one DNS record from the service provider to the DNS entity via the computer network; such that a DNS registry for the domain name obtains and implements the change to the at least one DNS record.

Various optional features of the above embodiments include the following. The service provider may include a DNS operator, and the at least one DNS record may include at least one of a name server (NS) DNS resource record or a delegation signer (DS) DNS resource record. The service provider may include a mail exchanger, and the at least one DNS record may include a mail exchanger (MX) DNS resource record. The DNS entity may include a DNS registrar. The DNS entity may include a DNS registry. The sending to a DNS entity for the domain name, electronically and via the computer network, an identification of a DNS service provider and a public key of an asymmetric cryptographic scheme of the DNS service provider may include sending a digital certificate digitally signed by a certification authority's private key of an asymmetric cryptographic scheme, where the certificate is validatable by a certification authority's public key corresponding to the certification authority's private key. The sending the digital certificate may include sending by way of a representational state transfer interface at the DNS entity. The certification authority may include one of the registrar, the registrant, and the DNS registry. The sending data representing the change to the at least one DNS record may include sending by way of a representational state transfer interface at the DNS entity. The operations may further include: receiving, by the service provider and from the DNS entity, via the computer network, an access token, where the access token specifies permissible DNS resource record actions, and where the access token includes a digital signature; where the sending data representing the change to the at least one DNS record further includes sending the access token. The change may include a DNS resource record update, a DNS resource record creation, or a DNS resource record deletion.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Currently, a registrar typically initiates changes (e.g., additions, deletions, modifications) to DNS resource records for a domain at a registry, on behalf of a registrant. However, there are several challenges to this approach when the DNS operator for the domain is not itself the registrar. In such a case, the DNS operator is dependent on the registrant to initiate the changes to the DNS records via a user interface provided by the registrar. This is a manual process that involves passing the changes through a human registrant, and is therefore highly prone to errors.

Some embodiments use an interface at a registry or registrar that permits third-party DNS service providers (i.e., any entity that proves a DNS-related service) to programmatically initiate changes to DNS resource records. More particularly, some embodiments perform a technique for validating such requests. Such embodiments solve the computer-centric problem of permitting DNS service providers to implement changes to the DNS system.

I. The DNS

Figure 1:
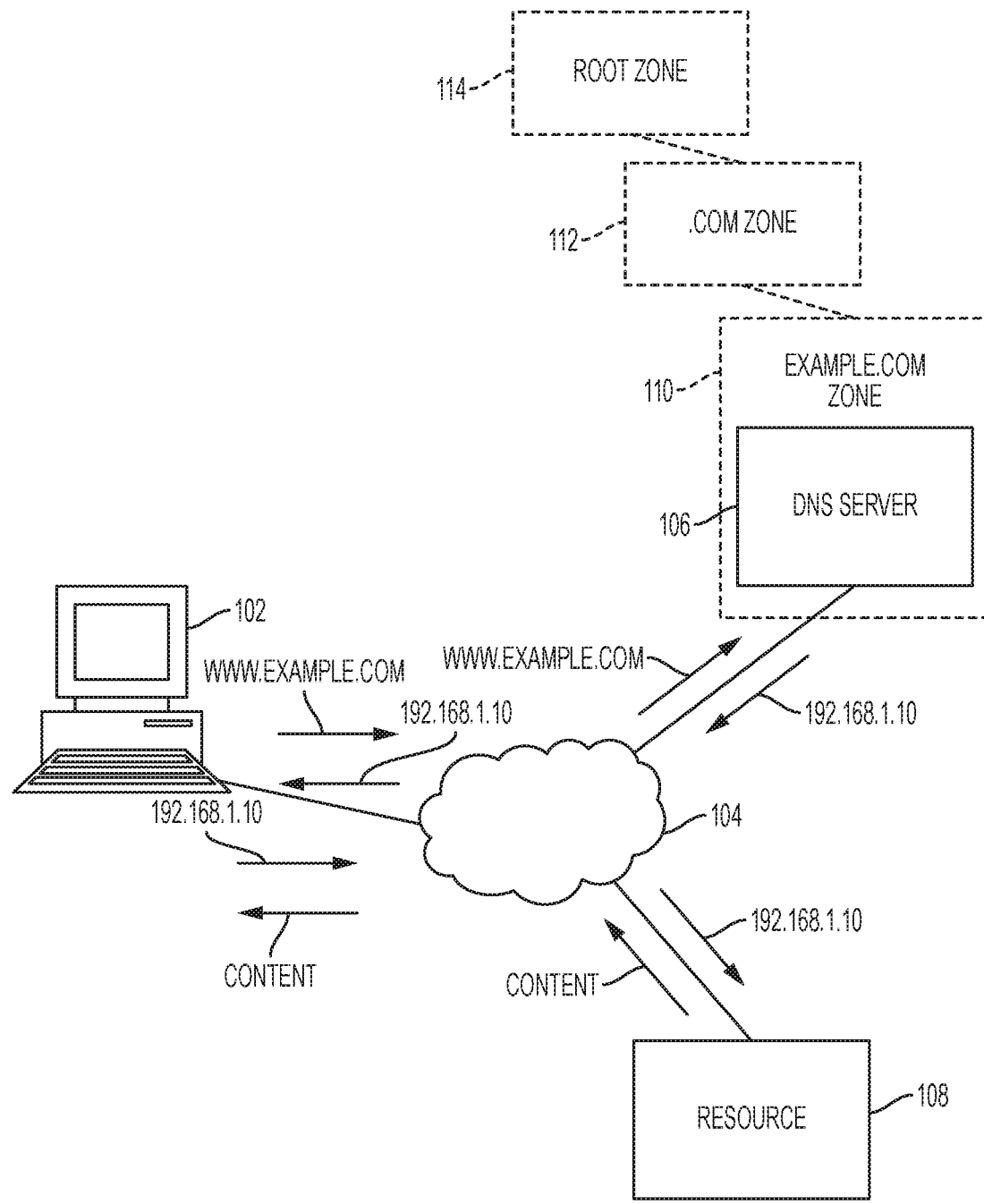
FIG. 1 is a schematic diagram depicting, by way of background, an example DNS interaction.

FIG. 1 is a schematic diagram depicting, by way of background, an example DNS interaction. Note that the interaction depicted by FIG. 1 does not necessarily involve an embodiment of the invention. Instead, FIG. 1 depicts an overview of one example of how DNS enables computers connected to the internet to operate using domain names instead of numerical IP addresses. That is, although networked computers generally rely on numerical locators such as IP addresses, human beings are ill-equipped to memorize such locators. Accordingly, DNS enables humans to rely on easy-to-remember domain names to access resources and data.

A user may utilize client computer 102. The user may enter a domain name, e.g., www.example.com, in the navigation field of a web browser executing on client computer 102 to obtain an internet resource. Client computer 102 operates and/or contacts a recursive DNS server (not shown) to look up the IP address corresponding to www.example.com. In particular, client computer 102 may send a resource record query to a local resolver such as a recursive DNS server (not shown). For purposes of this example, the recursive DNS server lacks a resource record for www.example.com. According to the DNS protocol, the recursive DNS server may in this example query the root zone 114 for this record. By way of a referral that includes an NS resource record, the root server points to an authoritative name server for .com zone 112 (i.e., for the top-level domain .com). The authoritative name server for .com zone 112 provides an NS resource record that points to the authoritative name server 106 for the zone for example.com. Authoritative name server 106 responds with an appropriate DNS record (e.g., A or AAAA) that includes the requested IP address for www.example.com. Client computer 106 receives the resource record and parses it to extract the IP address. Client computer then contacts the IP address, which leads to server computer 108, which hosts the requested resource. Server computer 108 responds with the requested resource, e.g., content.

Figure 2:
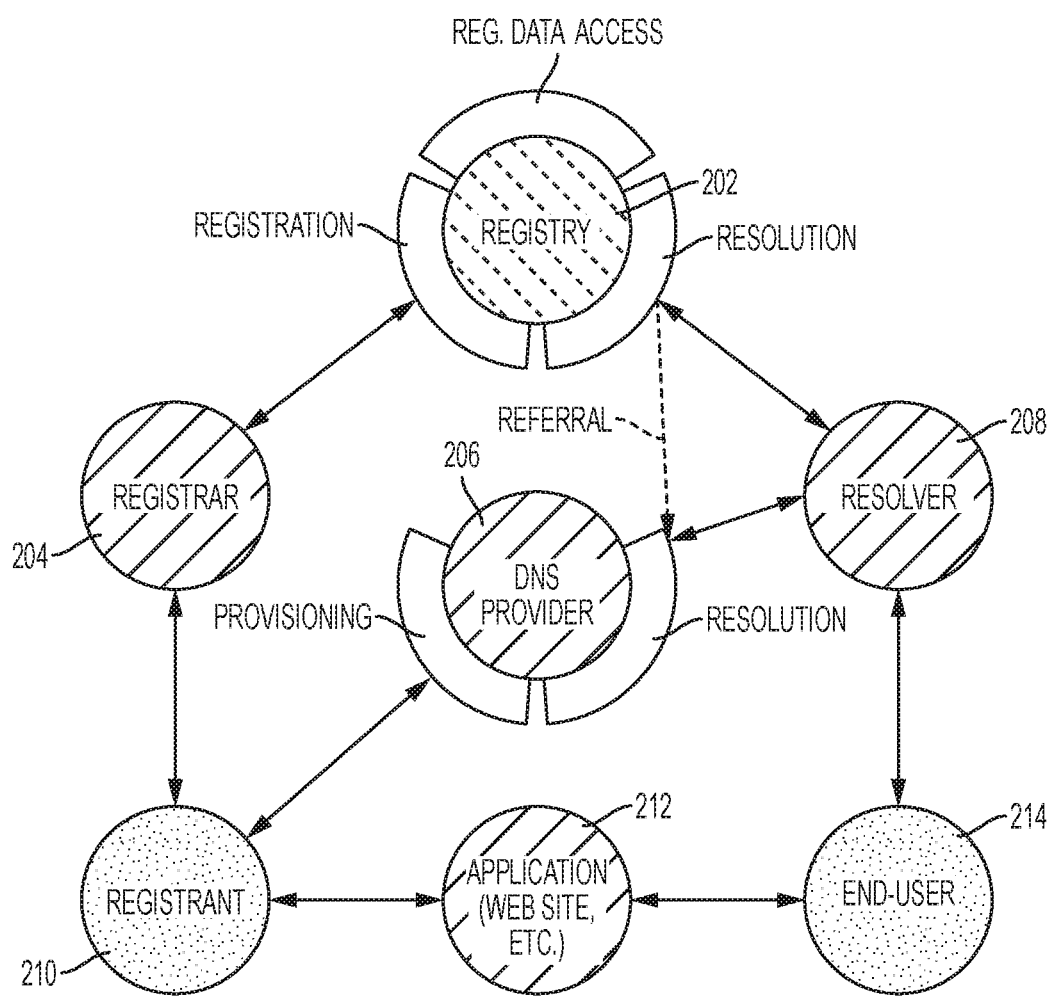
FIG. 2 is a schematic diagram of certain DNS entities and their relations.
Figure 3:
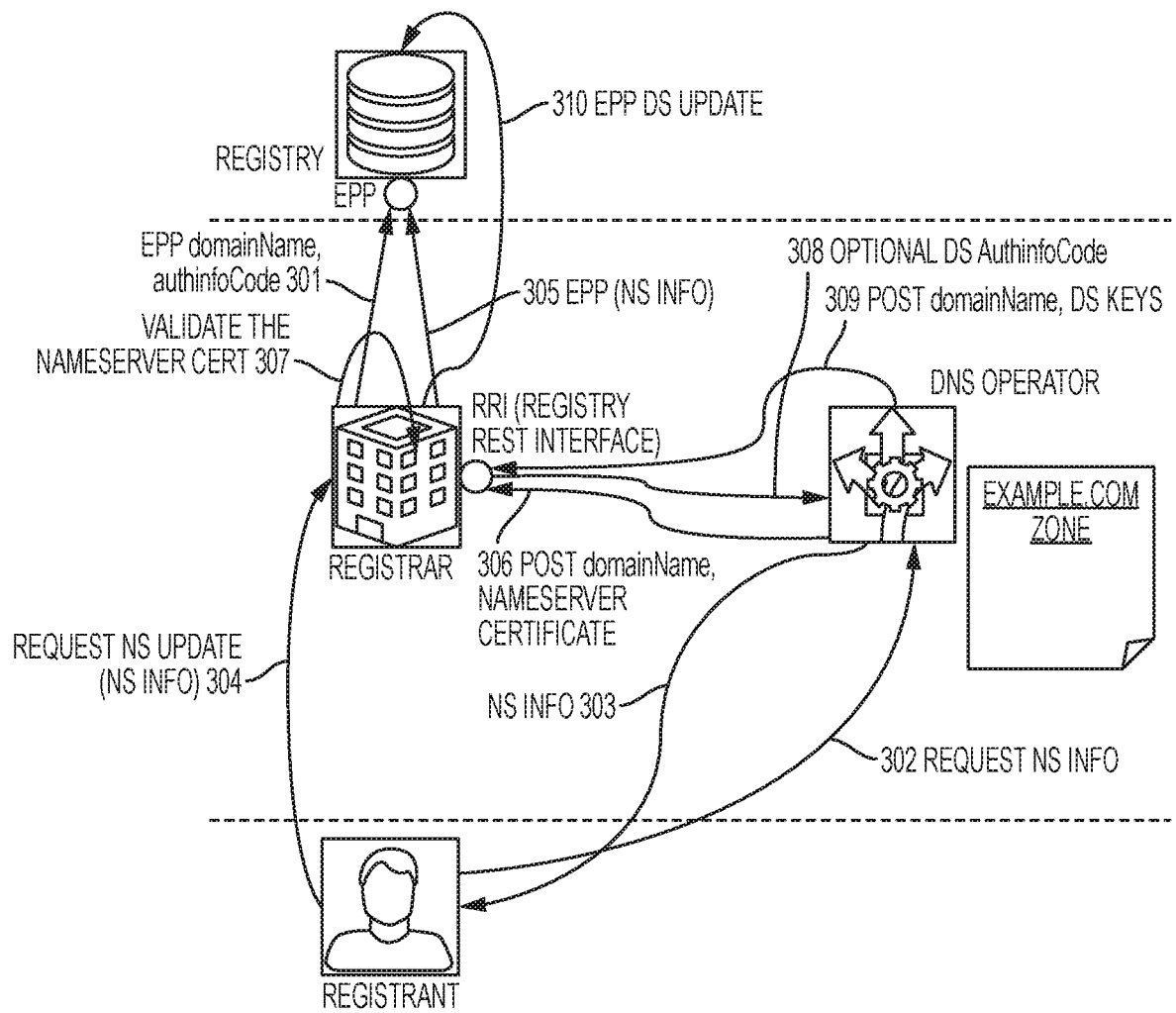
FIG. 3 is a schematic diagram of a technique for a registrar to validate a DNS operator's request to change DNS resource records by using a digital certificate according to some embodiments.

FIG. 2 is a schematic diagram of certain DNS entities and their relations. In particular, FIG. 3 depicts the entities involved with the domain name registration process (e.g., provisioning) and the entities involved with the domain name resolution process (e.g., as presented above with respect to FIG. 1).

The entities involved in the domain name resolution process include end user 214 (that is, the internet user attempting to access an application such as a web page or a resource), local resolver 208, and DNS provider 206 (as operator of an authoritative DNS server. An example of the domain name resolution process is shown and described above in reference to FIG. 1.

The entities involved with the domain name registration process include registrant 210, registrar 204, and registry 202.

Note that, as depicted in FIG. 2, DNS provider 206 has no direct relationship with registrar 204. Therefore, in the prior art, DNS-related communications between DNS provider 206 and registrar 204 typically pass through registrant 210. Moreover, although registrar 204 may have an internet-connected user interface through which registrant 210 may request DNS resource record changes, such an interface is not available to DNS provider 206 in prior art systems. Accordingly, DNS provider 206 lacks the ability to implement resource record changes. Some embodiments provide an authenticated technique for third-party DNS service providers to affect changes to DNS resource records.

II. Certificate-Based Registrar Authentication

FIG. 3 is a schematic diagram of a technique for a registrar to validate a DNS operator's request to change DNS resource records by using a digital certificate according to some embodiments. For the technique of FIG. 3, the depicted registrant has registered a domain name using the depicted registrar. The technique depicted in FIG. 3 may be performed by a third party that is neither a DNS registrar for the domain name, nor a DNS registrant for the domain name, nor a DNS registry for the domain name. For ease of discussion, the technique of FIG. 3 is presented herein with the third party being a DNS operator, although the third party may be any of a variety of other entities instead, e.g., an mail exchanger or a web hosting provider. Details of how the disclosed technique may be implemented for such other entities are presented at the end of the discussion of FIG. 3.

The DNS operator depicted in FIG. 3 is the operator of the name server identified by the NS record at the parent zone. It may also manage the key-signing key whose fingerprint is published as the delegation signer (DS) DNS resource record at the parent zone.

At 301, the registrar sends an electronic provisioning protocol (EPP) command to the registry setting forth the registration by the registrar of the subject domain name. The registration may initially specify that authority for the subject domain name is delegated to a name server operated by the registrar, i.e., that an NS record should be included in the registry's zone that points to that name server. This is a default initial configuration, and the registrant may subsequently want to change to a different name server. The registrar may also optionally send an authentication information (e.g., an AuthInfoCode) to the registry at this step.

At 302, the registrant sends an electronic request to its selected DNS operator, requesting name server information. The registrant will use the requested information to inform the registrar, which ultimately informs the registry, of the name server for the domain.

At 303, the DNS operator replies to the registrant with the requested name server information. This may be in the form of one or more NS resource record(s), for example, for the DNS operator.

At 304, the registrant sends an electronic message to the registrar for the subject domain name identifying the name server for the domain name. This message serves as a request for the registrar to update the NS resource record for the subject domain name. Thus, the registrant specifies its selection of DNS operator to the registrar by specifying an NS resource record (and/or some other identifying information for the name server). Thus, the registrar has an explicit indication that the DNS operator can manage the subject domain name on behalf of the registrant.

At 305, the registrar sends an electronic message to the registry to update the name server information, i.e., the NS record, for the subject domain name.

At 306, the DNS operator, intending to request additional updates via the registrar, proceeds to authenticate itself with the registrar. To authenticate itself with the registrar according to some embodiments, that is, for the DNS operator to demonstrate that it is the identified operator of a name server, it may present to the registrar a digital certificate that associates its public key with the DNS name server's domain name, i.e., a name server certificate. (Note that the public key may be different than other public keys employed by the DNS operator, e.g., from the DNSSEC keys employed for signing zones, and from keys employed for establishing secure channels to the name servers.) The certificate may be signed by a certification authority (CA) and include a copy of the DNS operator's public key and the name server's domain name. The registrar may store the certificate for future use. Looking ahead, as part of 307, the DNS operator may prove its possession of the corresponding private key, and at 309, the registrar may then accept requests from the DNS operator to perform actions on domain names delegated to that DNS operator, i.e. to its name server. A representational state transfer, i.e., REST interface with an HTTP POST command, is shown in the figure as an example technique for initiating authentication.

Note that the DNS operator may use some trusted certification authority (CA) to sign (using the certification authority's private key) the certificate that includes a copy of the DNS operator's public key and identifies the name server's domain name. The certificate could be issued by a certification authority that confirms the DNS operator is accredited according to certain contractual rules. Various entities may serve as the certification authority. In some embodiments, the registry or registrar is the certification authority. In some embodiments, the registrar takes the role of certification authority, in effect asserting its delegation of authority to the DNS operator via the certificate.

As another authentication example according to some embodiments, the DNS operator may authenticate to the registrar via the TLS protocol, where the DNS operator presents the name server certificate as a TLS client certificate. If TLS connection is successful, the registrar can then trust that the client is the identified operator of the name server.

As another authentication example according to some embodiments, instead of a certificate, the registrar, or an external service, may maintain a list of name server public keys. The registrar may consult this list at 307 to determine which public key or keys to accept for a given name server, and the DNS operator may authenticate itself with the corresponding private key.

As another authentication example according to some embodiments, the registrar, or an external service, may maintain a list of DNS operator identities, e.g., the organizational name of the DNS operator. The DNS operator may then authenticate itself via a certificate for its identity, and the registrar may consult the list at 307 to determine which identity or identities to accept for a given name server.

Returning to the discussion of certificate-based authentication, at 307, the registrar validates the certificate. Note that this may occur either after or before 309, but always before 310. The registrar validates the certificate by confirming that the certification authority's public key correctly verifies a signature on the certificate (e.g., confirming a hash of the certificate's contents). Because the registrar trusts the certification authority, this validates the DNS operator's public key as actually being the DNS operator's, which the registrar knows the registrant intends to have manage the subject domain name due to 304.

If the validation is successful, the registrar may accept and implement future requests from the DNS operator related to the subject domain name. In some embodiments, the registrar may provide authentication information to a DNS operator following the initial authorization that, e.g., uses a digital certificate. The DNS operator may then use the authentication information to make further requests.

Otherwise, if the validation is unsuccessful, the registrar may refuse to implement future requests from the DNS operator for the subject domain name (until such time as validation is successful).

At 308, the registrar optionally sends authentication information (e.g., an AuthInfoCode), which may have been previously sent to the registry as part of the subject domain name provisioning at 301, to the DNS operator. The DNS operator may use the authentication information to authenticate subsequent requests to the registrar and/or the registry.

At 309, the DNS operator (e.g., name server in this example) sends a request to the registrar, over an authenticated and optionally encrypted communications channel protected with the DNS operator's private key, and/or signed using the DNS operator's private key. The registrar uses the previously-validated DNS operator's public key to establish the secure channel and/or validate the signature on the request. If the request is transmitted successfully over the secure communications channel, or, respectively, if the signature is validated, the registrar may implement the request.

The DNS operator's request may be to make an update to the NS record and/or the associated DS record, having demonstrating its association with the identifying information provided by the registrant, e.g., via the above-described certificate-based authentication where the certificate includes the identifying information.

Note that the delegation of a domain name to a given DNS operator provides explicit authorization for the DNS operator to act on behalf of the registrant with respect to changes to the delegated (child) zone. Therefore, the request is not limited to implementing changes to NS and DS records. In some embodiments, the request may be to implement changes to other records stored at the parent zone, or to other registration data (RDAP, WHOIS, etc.). The scope of permissible changes may be set forth by registrar policy.

At 310, the registrar sends an EPP message to the registry to update its records in its authoritative database consistent with the request. That is, the registrar sends an EPP command to the registry to store the updated DNS record(s) in the registry's authoritative database.

This may conclude the technique of FIG. 3, with the following notes regarding variations and alternatives.

Note that typically more than one domain name is delegated to a given DNS operator. Thus, once the DNS operator has authenticated to the registrar, the DNS operator can perform actions related to multiple of these domain names. In particular, in some embodiments, the DNS operator does not need to re-authenticate for each separate domain name it manages.

Note further that a DNS operator may operate multiple name servers. The DNS operator may have a different certificate for each name server, or alternatively, some or even all of the name servers could be specified in the same certificate. Thus, the DNS operator could authenticate once to establish a secure channel to the registrar to make requests on some or even all of the domain names it manages across multiple name servers.

As described above, the method of FIG. 3 may be implemented using a variety of third-party service providers, not limited to a DNS operator as described above. The following describes how an email service provider may be used instead of the DNS operator in the above description of FIG. 3.

The email service provider may be the operator of the mail exchanger identified by an MX resource record at the parent zone. At 304, the registrant may specify its selection of the mail exchanger to the registrar by specifying an MX resource record (and/or by some other identifier for the mail exchanger) obtained by interactions such as 302, 303. The mail exchanger can then make updates to the MX record at 309 by demonstrating its association with the identifying information provided by the registrant, e.g., via certificate-based authentication per 306 and 307.

Note that according to some embodiments, DNS resource record updates may also be conveyed by one third-party service provider to another. For example, the mail exchanger could update the MX record via the DNS operator. In this example, the registrant may specify its selection of mail exchanger to the DNS operator, and the mail exchanger may authenticate with respect to this identifying information. Such a chain of updates may be arbitrarily long.

Thus, as another example of a third-party service provider other than a DNS operator, a web hosting provider may be used instead of the DNS operator in the above description of FIG. 3 as follows. The web hosting provider could manage the DNS A or AAAA resource record that specifies the IP address of a web server for the subject domain name. In some embodiments, the A/AAAA records are included in the parent zone, in which case the web hosting provider may follow the processes as described above for changes to NS or MX records. In other embodiments, the A/AAAA records are included in a child zone. Here, the web hosting provider may change the DNS resource records via the DNS operator that is authoritative for the child zone, following the certificate-based authentication methods described herein, wherein the web hosting provider has a certificate associating it with the A/AAAA records, and/or the domain name.

III. Certificate-Based Registry Authentication

Figure 4:
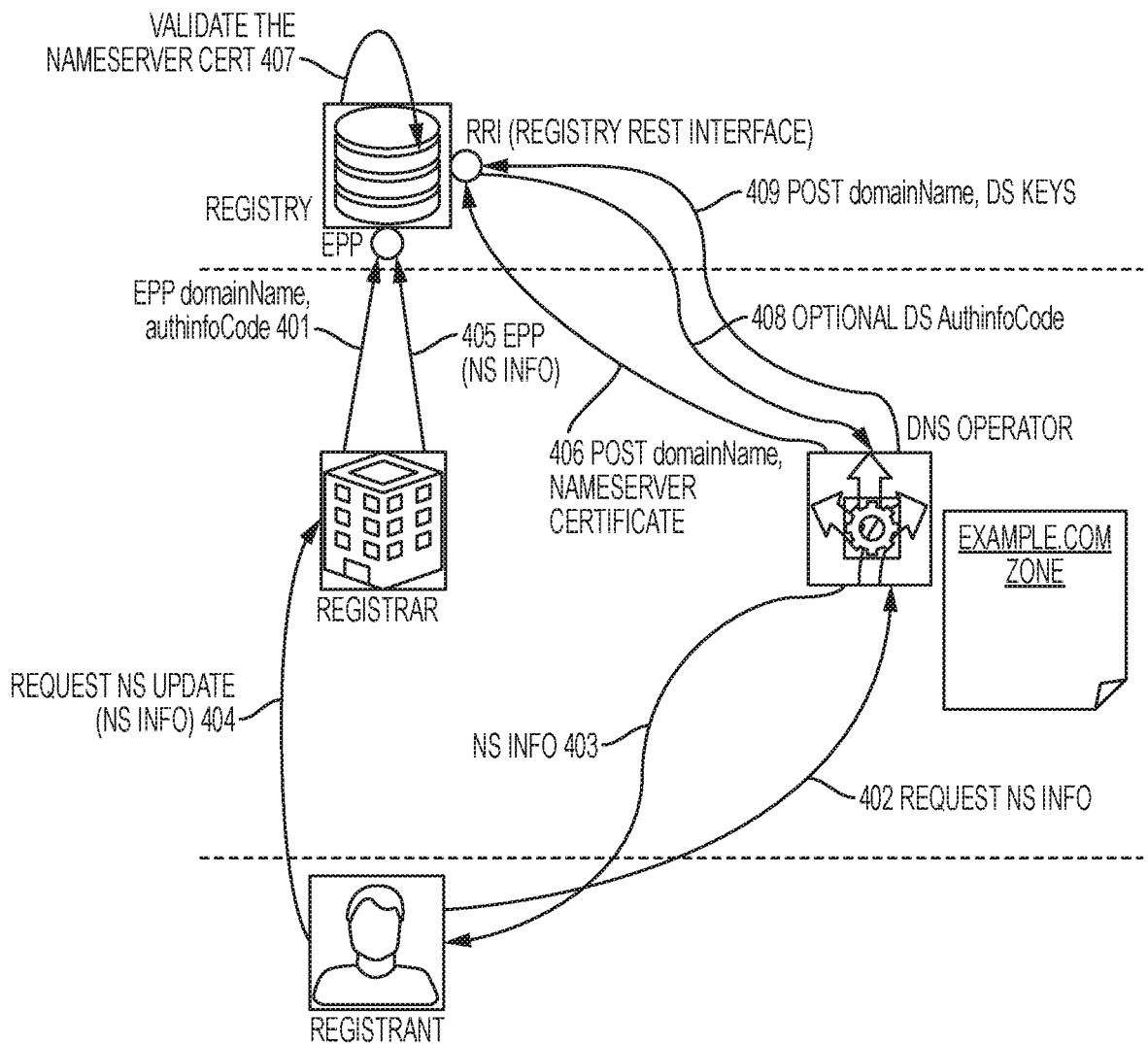
FIG. 4 is a schematic diagram of a technique for a registry to validate a DNS operator's request to change DNS resource records by using a digital certificate according to some embodiments.

FIG. 4 is a schematic diagram of a technique for a registry to validate a DNS operator's request to change DNS resource records by using a digital certificate according to some embodiments. The technique of FIG. 4 is similar to the technique of FIG. 3, except that, among other differences, in the technique of FIG. 3 the DNS operator provides a certificate the registrar, whereas in the technique of FIG. 4 the DNS operator provides a certificate to and transacts directly with the registry.

For the technique of FIG. 4, the depicted registrant has registered a domain name using the depicted registrar. The technique depicted in FIG. 4 may be performed by a third party that is neither a DNS registrar for the domain name, nor a DNS registrant for the domain name, nor a DNS registry for the domain name. For ease of discussion, the technique of FIG. 4 is presented herein with the third party being a DNS operator, although the third party may be any of a variety of other entities instead, e.g., an mail exchanger or a web hosting provider. Details of how the disclosed technique may be implemented for such other entities are presented at the end of the discussion of FIG. 4.

The DNS operator is the operator of the name server identified by the NS record at the parent zone. It may also manage the key-signing key whose fingerprint is published as the DS record at the parent zone.

At 401, the registrant sends an electronic provisioning protocol (EPP) command to the registry setting forth the registration by the registrant of the subject domain name. The registration may initially specify that authority for the subject domain name is delegated to a name server operated by the registrar, i.e., that an NS record should be included in the registry's zone that points to that name server. This is a default initial configuration, and the registrant may subsequently want to change to a different name server. The registrar may also optionally send an authentication information (e.g., an AuthInfoCode) to the registry at this step.

At 402, the registrant sends an electronic request to its selected DNS operator, requesting name server information. The registrant will use the requested information to inform the registrar, and ultimately the registry, of the name server for the domain.

At 403, the DNS operator replies to the registrant with the requested name server information. This may be in the form of one or more NS resource record(s), for example, for the DNS operator.

At 404, the registrant sends an electronic message to the registrar for the subject domain name identifying the name server for the domain name. This message serves as a request for the registrar to update the NS resource record for the subject domain name. Thus, the registrant specifies its selection of DNS operator to the registrar by specifying an NS record (and/or some other identifying information for the name server). Thus, the registrar has an explicit indication that the DNS operator can manage the subject domain name on behalf of the registrant.

At 405, the registrar sends an electronic message to the registry to update the name server information, i.e., the NS resource record, for the subject domain name.

At 406, the DNS operator, intending to request additional updates via the registrar, proceeds to authenticate itself with the registry. To authenticate itself with the registry according to some embodiments, that is, for the DNS operator to demonstrate that it is the identified operator of a name server, it may present to the registry a digital certificate that associates its public key with the name server's domain name, i.e., a name server certificate. (Note that the public key may be different than other public keys employed by the DNS operator, e.g., from the DNSSEC keys employed for signing zones, and from keys employed for establishing secure channels to the name servers.) The certificate may be signed by a certification authority and include a copy of the DNS operator's public key and the name server's domain name. The registry may store the certificate for future use.

Looking ahead, as part of 407, the DNS operator may prove its possession of the corresponding private key, and at 409, the registrar may accept requests from the DNS operator to perform actions on domain names delegated to that DNS operator, i.e., to its name server. A representational state transfer, i.e., REST interface with an HTTP POST command, is shown in the figure as an example technique for initiating authentication but without limitation.

Note that the DNS operator may use some trusted certification authority (CA) to sign (using the certification authority's private key) the certificate that includes a copy of the DNS operator's public key and identifies the name server's domain name. The certificate could be issued by a certification authority that confirms the DNS operator is accredited according to certain contractual rules. Various entities may serve as the certification authority. In some embodiments, the registry or registrar is the certification authority. In some embodiments, the registrant takes the role of certification authority, in effect asserting its delegation of authority to the DNS operator via the certificate.

As another authentication example according to some embodiments, the DNS operator may authenticate to the registry via the TLS protocol, where the DNS operator presents the name server certificate as a TLS client certificate. If TLS connection is successful, the registry can then trust that the client is the identified operator of the name server.

As another authentication example according to some embodiments, instead of a certificate, the registry, or an external service, may maintain a list of name server public keys. The registry may consult this list at 307 to determine which public key or keys to accept for a given name server, and the DNS operator may authenticate itself with the corresponding private key.

As another authentication example according to some embodiments, the registry, or an external service, may maintain a list of DNS operator identities, e.g., the organizational name of the DNS operator. The DNS operator may then authenticate itself via a certificate for its identity, and the registry may consult the list at 407 to determine which identity or identities to accept for a given name server.

Returning to the discussion of certificate-based authentication, at 407, the registry validates the certificate. The registry validates the certificate by confirming that the certification authority's public key correctly verifies a signature on the certificate (e.g., confirming a hash of the certificate's contents). Because the registry trusts the certification authority, this validates the DNS operator's public key as actually being the DNS operator's, which the registry knows the registrant intends to have manage the subject domain name due to 405.

If the validation is successful, the registry may accept and implement future requests from the DNS operator related to the subject domain name. In some embodiments, the registry may provide authentication information to a third-party DNS operator following the initial authorization that, e.g., uses a digital certificate. The DNS operator may then use the authentication information to make further requests.

Otherwise, if the validation is unsuccessful, the registry may refuse to implement future requests from the DNS operator for the subject domain name (until such time as validation is successful).

At 408, the registrar optionally sends the authentication information (e.g., an AuthInfoCode), which may have been previously sent to the registry as part of the subject domain name provisioning at 401, to the DNS operator. The DNS operator may use authentication information to authenticate subsequent requests to the registrar and/or the registry.

At 409, the name server sends a request to the registry, over an authenticated and optionally encrypted communications channel protected with the DNS operator's public/private key pair, and/or signed using the DNS operator's private key. The registry uses the previously-validated DNS operator's public key to establish the secure channel and/or validate the signature on the request. If the request is transmitted successfully over the secure communications channel, or, respectively, if the signature is validated, the registry may implement the request.

The DNS operator's request may be to make an update to the NS record and/or the associated DS record, having demonstrating its association with the identifying information provided by the registrant, e.g., via the above-described certificate-based authentication where the certificate includes the identifying information.

Note that the delegation of a domain name to a given DNS operator provides explicit authorization for the DNS operator to act on behalf of the registrant with respect to changes to the delegated (child) zone. Therefore, the request is not limited to implementing changes to NS and DS records. In some embodiments, the request may be to implement changes to other records stored at the parent zone, or to other registration data (RDAP, WHOIS, etc.). The scope of permissible changes may be set forth by registry policy.

The registry then updates its records in its authoritative database consistent with the request.

This may conclude the technique of FIG. 4, with the following notes regarding variations and alternatives.

Note that typically more than one domain name is delegated to a given DNS operator. Thus, once the DNS operator has authenticated to the registry, the DNS operator can perform actions related to multiple of these domain names. In particular, in some embodiments, the DNS operator does not need to re-authenticate for each separate domain name it manages.

Note further that a DNS operator may operate multiple name servers. The DNS operator may have a different certificate for each name server, or alternatively, some or even all of the name servers could be specified in the same certificate. Thus, the DNS operator could authenticate once to establish a secure channel to the registry to make requests on some or even all of the domain names it manages across multiple name servers.

As described above, the method of FIG. 4 may be implemented using a variety of third-party service providers, not limited to a DNS operator as described above. The following describes how an email service provider may be used instead of the DNS operator in the above description of FIG. 4.

The email service provider may be the operator of the mail exchanger identified by an MX resource record at the parent zone. At 404, the registrant may specify its selection of the mail exchanger to the registrar by specifying an MX resource record (and/or by some other identifier for the mail exchanger) obtained in exchanges 402, 403. The mail exchanger can then make updates to the MX resource record at 409 by demonstrating its association with the identifying information provided by the registrant, e.g., via certificate-based authentication per 406 and 407.

Note that according to some embodiments, DNS resource record updates may also be conveyed by one third-party service provider to another. For example, the mail exchanger could update the MX resource record via the DNS operator. In this example, the registrant may specify its selection of mail exchanger to the DNS operator, and the mail exchanger may authenticate with respect to this identifying information. Such a chain of updates may be arbitrarily long.

Thus, as another example of a third-party service provider other than a DNS operator, a web hosting provider may be used instead of the DNS operator in the above description of FIG. 4 as follows. The web hosting provider could manage the DNS A or AAAA resource record that specifies the IP address of a web server for the subject domain name. In some embodiments, the A/AAAA records are included in the parent zone, in which case the web hosting provider may follow the processes as described above for NS and MX resource records. In other embodiments, the A/AAAA records are included in a child zone. Here, the web hosting provider may update the DNS resource records via the DNS operator that is authoritative for the child zone, following the certificate-based authentication methods described herein, wherein the web hosting provider has a certificate associating it with the A/AAAA records, and/or the domain name.

IV. Token-Based Registrar Authentication

Figure 5:
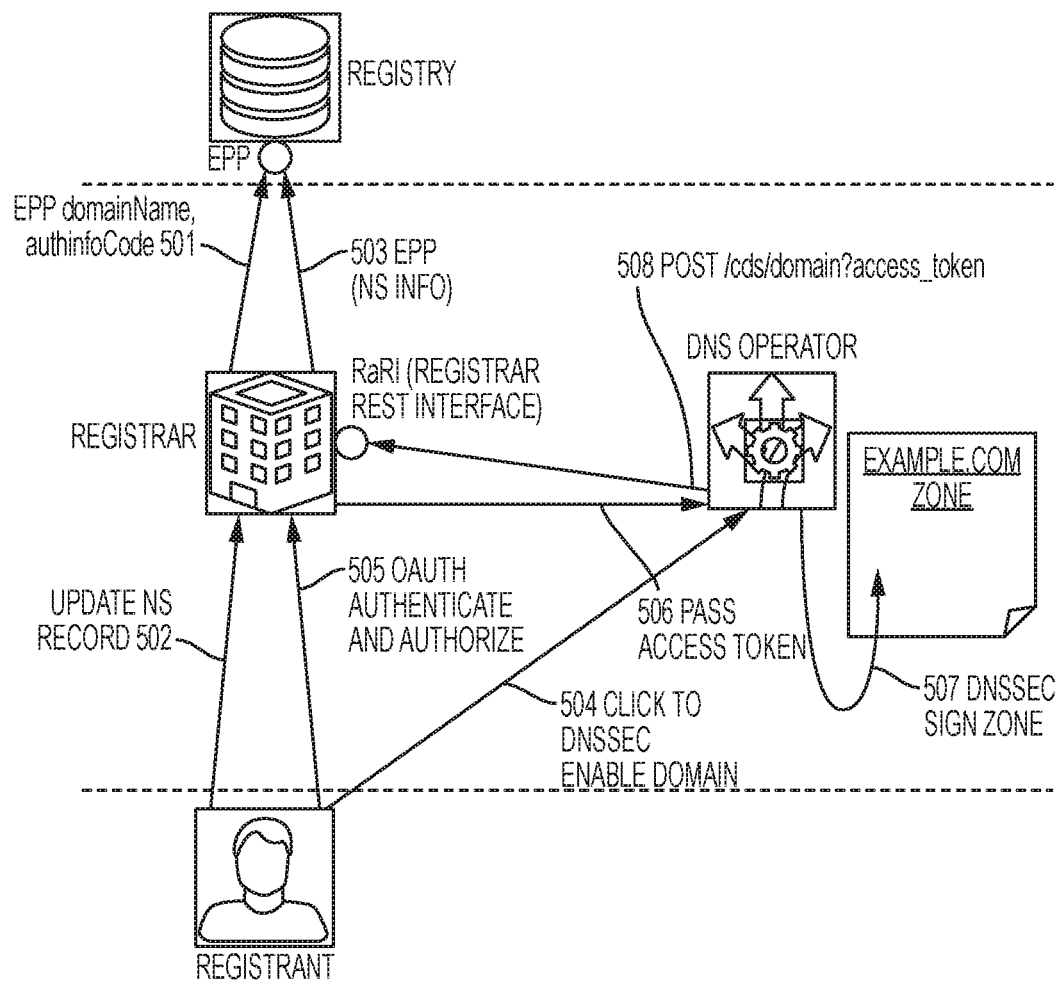
FIG. 5 is a schematic diagram of a technique for a registrar to validate a DNS operator's request to change DNS resource records by using an access token according to some embodiments.

FIG. 5 is a schematic diagram of a technique for a registrar to validate a DNS operator's request to change DNS resource records by using an access token according to some embodiments. For the technique of FIG. 5, the depicted registrant has registered a domain name using the depicted registrar. The technique depicted in FIG. 5 may be performed by a third party that is neither a DNS registrar for the domain name, nor a DNS registrant for the domain name, nor a DNS registry for the domain name. For ease of discussion, the technique of FIG. 5 is presented herein with the third party being a DNS operator, although the third party may be any of a variety of other entities instead, e.g., an mail exchanger or a web hosting provider. Details of how the disclosed technique may be implemented for such other entities are presented at the end of the discussion of FIG. 5.

At 501, the registrar sends an electronic provisioning protocol (EPP) command to the registry setting forth the registration by the registrant of the subject domain name. The registration may initially specify that authority for the subject domain name is delegated to a name server operated by the registrar, i.e., that an NS record should be included in the registry's zone that points to that name server. This is a default initial configuration, and the registrant may subsequently want to change to a different name server.

At 502, the registrant sends an electronic message to the registrar for the subject domain name identifying the name server for the domain name. This message serves as a request for the registrar to update the name server record for the subject domain name. Thus, the registrant specifies its selection of DNS operator to the registrar by specifying an NS resource record (and/or some other identifying information for the name server). Thus, the registrar has an explicit indication that the DNS operator can manage the subject domain name on behalf of the registrant.

Note that 502 may be preceded by exchanges such as 302 and 303 of FIG. 3 between the registrant and DNS operator, such that the registrant obtains the NS resource record (or its equivalent) from the DNS operator.

Note also that step 502 is optional. In particular, if the more automated process described next is in place, then, rather than registrant providing its indication that the DNS operator can manage the domain name by a conventional message per step 502, the registrant can provide its indication as a result of the sequence of commands described next wherein the selection of name server in step 502 is presented as part of a change request pre step 508.

At 503, the registry forwards information to the registrar that identifies the DNS name server for the subject domain. This may be in the form of one or more NS record(s), for example.

At 504, the registrant sends an electronic request to the DNS operator for the subject domain name, requesting a resource record change for the domain name. Such a change may include, for example, adding and modifying resource records so as to establish DNSSEC compliance for the domain. The message may be sent through a web interface provided by the DNS operator to the registrant for implementing changes such as the requested change. The message may be sent by, for example, the registrant clicking on a button or link present on such an interface.

At 505, the DNS operator directs the registrant to the registrar to perform an authentication protocol. The direction may be an internet redirection, for example, including the DNS operator passing a uniform resource locator (URL) for the registrar to the registrant. The authentication protocol may include one or several message exchanges between the registrant and registrar. Example authentication protocols include OAuth, 1.0 or OAuth 2.0, for example. Suitable authentication protocols may include the registrant passing a username and password for its preexisting account with the registrar to the registrar, and the registrar verifying the correctness of the passed information. The registrant may have established such an account for the purpose of registering a domain name (e.g., the subject domain name, or a different domain name) with the registrar.

If the registrar successfully verifies the correctness of the passed information, at 506, it passes an access token confirming the registrant's authorization to the DNS operator. The access token may be passed directly or via the registrant's computer or another intermediary. Alternatively, and/or in addition, a reference to the access token may be passed, wherein the actual access token is retrieved by the DNS operator by presenting the reference to an access token service. The access token may specify any, or a combination, of: the subject domain name, an identification of the registrant, an identification of permissions granted for changing resource records for the domain name, and the username/password combination previously supplied by the registrant. Any, or any combination, of these data may be encrypted in the token. Further, all or part of the contents of the token may be signed by the registrar with a digital signature, using the registrar's private key of an asymmetric cryptographic scheme.

At 507, the DNS operator receives the access token and optionally verifies it. The DNS operator may also take actions related to the change, either before or after the following steps, for example, signing a zone for the domain per DNSSEC specifications, and/or implementing changes for DNS resource records under its control.

At 508, the DNS operator interfaces with the registrar to implement the requested change at the registrar. The DNS operator may interface with the registrar using, for example, a representational state transfer interface, e.g., a REST interface. Such an interface may be a registrar REST interface. The DNS operator may pass the access token to the registrar, thereby proving that it is authorized to make the request. The DNS operator may also pass the changed resource record(s), or information representing the changed resource records, i.e., information sufficient to construct the changed resource records. The registrar may verify the validity of the access token by verifying the validity of a digital signature on the token, and then confirming that the token confers the authority to implement the requested change. The registrar may parse the identified permissions specified in the token as part of the validity verification process.

The DNS operator may subsequently request additional changes via repeated use of step 508, but without repeating steps 504-506, for as long as the access token remains valid. The DNS operator and registrar may repeat steps 504-506 when a new access token is needed, e.g., because of a change in scope and/or due to expiration. Note that similarly to step 308, the registrar may send the DNS operator authentication information (e.g., an AuthInfoCode), which may have been previously sent to the registry as part of the subject domain name provisioning at 501. The DNS operator may use this authentication information to authenticate subsequent requests to the registrar, in addition to and/or instead of the access token.

Subsequent to 508, the registrar may electronically pass to the registry the changed resource records (or information representing them) for storage in the registry's authoritative DNS database. As mentioned above, steps 504-508 may also be employed to establish the NS record initially, in place of step 502. The subsequent processing disclosed here can take the place of step 503.

This may conclude the technique of FIG. 5, with the following notes regarding variations and alternatives.

As described above, the method of FIG. 5 may be implemented using a variety of third-party service providers, not limited to a DNS operator. The following describes how an email service provider may be used instead of the DNS operator in the above description of FIG. 5.

The email service provider may be the operator of the mail exchanger identified by an MX resource record at the parent zone. At 502, the registrant may specify its selection of mail exchanger to the registrar by specifying an MX DNS resource record (and/or by some other identifier for the mail exchanger). The mail exchanger can then make updates to the MX resource record at 508 by providing its access token obtained per 504, 505, and 506.

Note that according to some embodiments, DNS resource record updates may also be conveyed by one third-party service provider to another. For example, the mail exchanger could update the MX record via the DNS operator. In this example, the registrant may specify its selection of mail exchanger to the DNS operator, and the mail exchanger may authenticate with respect to this identifying information. Such a chain of updates may be arbitrarily long.

Thus, as another example of a third-party service provider other than a DNS operator, a web hosting provider may be used instead of the DNS operator in the above description of FIG. 5 as follows. The web hosting provider could manage the DNS A or AAAA resource record that specifies the IP address of a web server for the subject domain name. In some embodiments, the A/AAAA records are included in the parent zone, in which case the web hosting provider may follow the processes as described above for NS and MX resource records. In other embodiments, the A/AAAA DNS resource records are included in a child zone. Here, the web hosting provider may update the records via the DNS operator that is authoritative for the child zone.

V. Token-Based Registry Authentication

Figure 6:
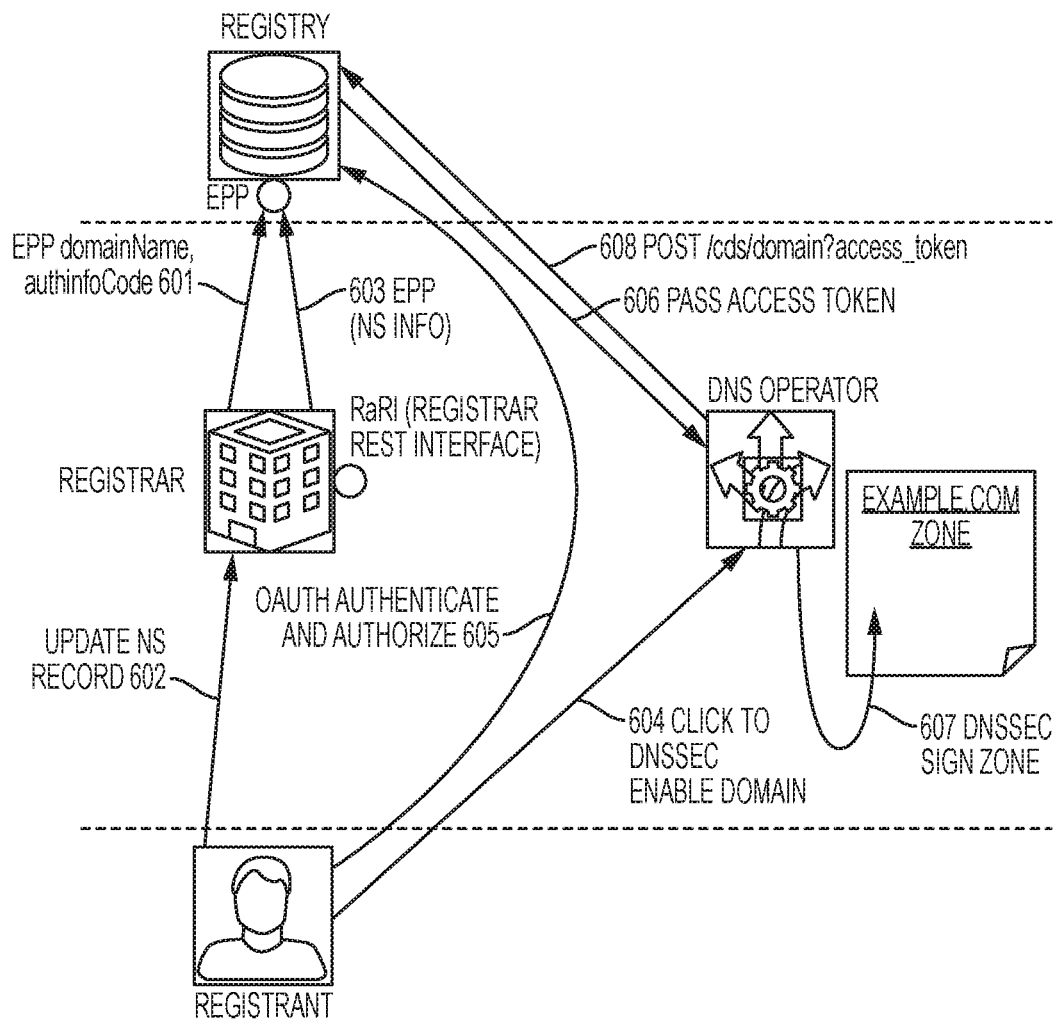
FIG. 6 is a schematic diagram of a technique for a registry to validate a DNS operator's request to change DNS resource records by using an access token according to some embodiments.

FIG. 6 is a schematic diagram of a technique for a registry to validate a DNS operator's request to change DNS resource records by using an access token according to some embodiments. The technique of FIG. 6 is similar to the technique of FIG. 5, except that, among other differences, in the technique of FIG. 5 the DNS operator obtains an access token from the registrar, whereas in the technique of FIG. 6 the DNS operator obtains an access token from the registry.

For the technique of FIG. 6, the depicted registrant has registered a domain name using the depicted registrar. The technique depicted in FIG. 6 may be performed by a third party that is neither a DNS registrar for the domain name, nor a DNS registrant for the domain name, nor a DNS registry for the domain name. For ease of discussion, the technique of FIG. 6 is presented herein with the third party being a DNS operator, although the third party may be any of a variety of other entities instead, e.g., an mail exchanger or a web hosting provider. Details of how the disclosed technique may be implemented for such other entities are presented at the end of the discussion of FIG. 6.

At 601, the registrar sends an electronic provisioning protocol (EPP) command to the registry setting forth the registration by the registrant of the subject domain name. The registration may initially specify that authority for the subject domain name is delegated to a name server operated by the registrar, i.e., that an NS record should be included in the registry's zone that points to that name server. This is a default initial configuration, and the registrant may subsequently want to change to a different name server.

At 602, the registrant sends an electronic message to the registry for the subject domain name identifying the name server for the domain name. This message serves as a request for the registry to update the name server record for the subject domain name. Thus, the registrant specifies its selection of DNS operator to the registry by specifying an NS resource record (and/or some other identifying information for the name server). Thus, the registry has an explicit indication that the DNS operator can manage the subject domain name on behalf of the registrant.

Note that 602 may be preceded by exchanges such as 402 and 403 between the registrant and DNS operator, such that the registrant obtains the NS record (or its equivalent) from the DNS operator.

Note also that step 602 is optional. In particular, if the more automated process described next is in place, then, rather than registrant providing its indication that the DNS operator can manage the domain name by a conventional message per step 602, the registrant can provide its indication as a result of the sequence of commands described next wherein the selection of name server in step 602 is presented as part of a change request pre step 608.

At 603, the registry forwards information to the registrar that identifies the DNS name server for the subject domain. This may be in the form of one or more NS resource record(s), for example.

At 604, the registrant sends an electronic request to the DNS operator for the subject domain name, requesting a resource record change for the domain name. Such a change may include, for example, adding and modifying resource records so as to establish DNSSEC compliance for the domain. The message may be sent through a web interface provided by the DNS operator to the registrant for implementing changes such as the requested change. The message may be sent by, for example, the registrant clicking on a button or link present on such an interface.

At 605, the DNS operator directs the registrant to the registry to perform an authentication protocol. The direction may be an internet redirection, for example, including the DNS operator passing a uniform resource locator (URL) for the registry to the registrant. The authentication protocol may include one or several message exchanges between the registrant and registry. Example authentication protocols include OAuth, 1.0 or OAuth 2.0, for example. Suitable authentication protocols may include the registrant passing a username and password for a preexisting or new account with the registry to the registry, and the registry verifying the correctness of the passed information. The registrant may have established such an account for the purpose of enabling a third-party (e.g., DNS operator) to implement DNS resource record changes.

If the registry successfully verifies the correctness of the passed information, at 606, it passes an access token confirming the registrant's authorization to the DNS operator. The access token may be passed directly or via the registrant's computer or another intermediary. Alternatively, and/ or in addition, a reference to the access token may be passed, wherein the actual access token is retrieved by the DNS operator by presenting the reference to an access token service. The access token may specify any, or a combination, of: the subject domain name, an identification of the registrant, an identification of permissions granted for changing resource records for the domain name, and the username/ password combination previously supplied by the registrant. Any, or any combination, of these data may be encrypted in the token. Further, all or part of the contents of the token may be signed by the registry with a digital signature, using the registry's private key of an asymmetric cryptographic scheme.

At 607, the DNS operator receives the access token and optionally verifies it. The DNS operator may also take actions related to the change, either before or after the following steps, for example, signing a zone for the domain per DNSSEC specifications, and/or implementing changes for DNS resource records under its control.

At 608, the DNS operator interfaces with the registry to implement the requested change at the registry. The DNS operator may interface with the registry using, for example, a representational state transfer interface, e.g., a REST interface. Such an interface may be a registry REST interface. The DNS operator may pass the access token to the registry, thereby proving that it is authorized to make the request. The DNS operator may also pass the changed resource record(s), or information representing the changed resource records, i.e., information sufficient to construct the changed resource records. The registry may verify the validity of the access token by verifying the validity of a digital signature on the token, and then confirming that the token confers the authority to implement the requested change. The registry may parse the identified permissions specified in the token as part of the validity verification process. The DNS operator may subsequently request additional changes via repeated use of step 608, but without repeating steps 504-506, for as long as the access token remains valid. The DNS operator and registrar may repeat steps 504-506 when a new access token is needed, e.g., because of a change in scope and/or due to expiration. Note that similarly to step 408, the registry may also send the DNS operator authentication information (e.g., an AuthInfoCode), which may have been previously sent to the registry as part of the subject domain name provisioning at 501. The DNS operator may use this authentication information to authenticate subsequent requests to the registry, in addition to and/or instead of the access token. As mentioned above, steps 604-608 may also be employed to establish the NS record initially, in place of step 602.

This may conclude the technique of FIG. 6, with the following notes regarding variations and alternatives.

As described above, the method of FIG. 6 may be implemented using a variety of third-party service providers, not limited to a DNS operator. The following describes how an email service provider may be used instead of the DNS operator in the above description of FIG. 6.

The email service provider may be the operator of the mail exchanger identified by an MX resource record at the parent zone. At 602, the registrant may specify its selection of mail exchanger to the registrar by specifying an MX resource record (and/or by some other identifier for the mail exchanger). The mail exchanger can then make updates to the MX resource record at 608 by providing its access token obtained per 604, 605, and 606.

Note that according to some embodiments, DNS resource record updates may also be conveyed by one third-party service provider to another. For example, the mail exchanger could update the MX resource record via the DNS operator. In this example, the registrant may specify its selection of mail exchanger to the DNS operator, and the mail exchanger may authenticate with respect to this identifying information. Such a chain of updates may be arbitrarily long.

Thus, as another example of a third-party service provider other than a DNS operator, a web hosting provider may be used instead of the DNS operator in the above description of FIG. 6 as follows. The web hosting provider could manage the DNS A or AAAA resource record that specifies the IP address of a web server for the subject domain name. In some embodiments, the A/AAAA records are included in the parent zone, in which case the web hosting provider may follow the processes as described above for NS and MX records. In other embodiments, the A/AAAA records are included in a child zone. Here, the web hosting provider may update the records via the DNS operator that is authoritative for the child zone.

VI. Combination and Variations

The methods described here may be combined in various ways. As one example, a service provider may authenticate initially to a registrar with asymmetric cryptography per FIG. 3, obtain authentication information, and then authenticate to a registry per FIG. 4 with that authentication information, or vice versa. As another, a service provider may obtain an access token from a registrar initially per FIG. 5, then authenticate to a registry per FIG. 6 with that access token, or vice versa. As yet another, a service provider may authenticate with both asymmetric cryptography and an access token for additional assurance.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method to electronically implement a change to at least one domain name system (DNS) resource record by a DNS service provider, the method comprising:
sending, by the DNS service provider, to a registry or a registrar for a domain name, an identification of the DNS service provider and a digital certificate signed by a private key of a certification authority, the digital certificate comprising information that identifies a public key of the DNS service provider,
wherein the digital certificate is validatable by a public key of the certification authority,
wherein an identity of the DNS service provider is confirmable using the public key of the DNS service provider,
wherein the DNS service provider is not the registrar for the domain name;
receiving, by the DNS service provider, an authentication information associated with the identity of the DNS service provider; and
sending, to the registry or registrar via the computer network, data that specifies a DNS resource record action and represents the change to the at least one DNS resource record and the authentication information, wherein the change to the at least one DNS resource record is obtainable by the registry to implement the change.

2. The method of claim 1, wherein the DNS service provider comprises a DNS operator, and wherein the at least one DNS resource record comprises at least one of a name server (NS) DNS resource record or a delegation signer (DS) DNS resource record.

3. The method of claim 1, wherein the DNS service provider comprises a mail exchanger, and wherein the at least one DNS resource record comprises a mail exchanger (MX) DNS resource record.

4. The method of claim 1, wherein the registry or registrar comprises a DNS registrar.

5. The method of claim 1, wherein the registry or registrar comprises a DNS registry.

6. The method of claim 1, wherein the sending the digital certificate comprises sending by way of a representational state transfer interface at the registry or registrar.

7. The method of claim 1, wherein the certification authority comprises one of the registrar, a registrant, or the registry.

8. The method of claim 1, wherein the sending data that specifies a DNS resource record action and represents the change to the at least one DNS resource record comprises: sending by way of a representational state transfer interface at the registry or registrar.

9. The method of claim 1, further comprising: receiving, by the DNS service provider and from the registry or registrar, via the computer network, an access token, wherein the access token comprises a digital signature and the data that specifies the DNS resource record action,
wherein the sending the data that specifies the DNS resource record action comprises sending the access token.

10. The method of claim 1, wherein the change comprises: an update to the DNS resource record, a creation of the DNS resource record, or a deletion of the DNS resource record.

11. The method of claim 1, wherein the DNS service provider was previously associated with the DNS resource record.

12. The method of claim 1, wherein the registry determines that the DNS service provider is authorized to make the change.

13. The method of claim 12,
wherein the DNS service provider comprises a DNS operator or a mail exchanger,
wherein the at least one DNS resource record comprises at least one of a name server (NS) DNS resource record, a delegation signer (DS) DNS resource record, or a mail exchanger (MX) DNS resource record,
wherein the registry or registrar determines that the DNS service provider is associated with the NS, DS, or MX record for the domain name.

14. The method of claim 1, wherein the DNS service provider receives the authentication information from the registrar.

15. A system for implementing a change to at least one domain name system (DNS) resource record by a DNS service provider, the system comprising at least one electronic computer comprising at least one electronic processor communicatively coupled to a computer network and configured to perform operations comprising:
sending, by the DNS service provider, to a registry or registrar for a domain name, an identification of the DNS service provider and a digital certificate signed by a private key of a certification authority, digital certificate comprising information that identifies a public key of the DNS service provider,
wherein the digital certificate is validatable by a public key of the certification authority,
wherein an identity of the DNS service provider is confirmable using the public key of the DNS service provider,
wherein the DNS service provider is not the registrar for the domain name;
receiving, by the DNS service provider, an authentication information associated with the identity of the DNS service provider; and
sending, to the registry or registrar via the computer network, data that specifies a DNS resource record action and represents the change to the at least one DNS resource record and the authentication information, wherein the change to the at least one DNS resource record is obtainable by the registry to implement the change.

16. The system of claim 15, wherein the DNS service provider comprises a DNS operator, and wherein the at least one DNS resource record comprises at least one of a name server (NS) DNS resource record or a delegation signer (DS) DNS resource record.

17. The system of claim 15, wherein the DNS service provider comprises a mail exchanger, and wherein the at least one DNS resource record comprises a mail exchanger (MX) DNS resource record.

18. The system of claim 15, wherein the registry or registrar comprises a DNS registrar.

19. The system of claim 15, wherein the registry or registrar comprises a DNS registry.

20. The system of claim 15, wherein the sending the digital certificate comprises sending by way of a representational state transfer interface at the registry or registrar.

21. The system of claim 15, wherein the certification authority comprises the registrar, a registrant, or the registry.

22. The system of claim 15, wherein the sending data that specifies a DNS resource record action and represents the change to the at least one DNS resource record comprises: sending by way of a representational state transfer interface at the registry or registrar.

23. The system of claim 15, wherein the operations further comprise:
- receiving, by the DNS service provider and from the registry or registrar, via the computer network, an access token, wherein the access token comprises a digital signatures and the data that specifies the DNS resource record action,
- wherein the sending the data that specifies the DNS resource record action comprises sending the access token.

24. The system of claim 15, wherein the change comprises: an update to the DNS resource record, a creation of the DNS resource record, or a deletion of the DNS resource record.

* * * * *